H. BUCK.

Bolster Springs for Vehicles.

No. 136,360. Patented March 4, 1873.

WITNESSES.
I. S. Lyon.
S. L. Denney.

INVENTOR.
Henry Buck

UNITED STATES PATENT OFFICE.

HENRY BUCK, OF POLO, ILLINOIS.

IMPROVEMENT IN BOLSTER-SPRINGS FOR VEHICLES.

Specification forming part of Letters Patent No. 136,360, dated March 4, 1873.

*To all whom it may concern:*

Be it known that I, HENRY BUCK, of Polo, in the county of Ogle and State of Illinois, have invented certain Improvements in Gum Springs for Wagons, of which the following is a specification:

This invention relates to the application of strips of gum for a simple, cheap, and efficient form of spring to be applied to the ordinary two-horse wagons in common use on our farms in our western prairie country. This cheap arrangement of spring possesses the flexibility necessary to render our wagons pleasant to ride in, and at a very small cost compared to that of the ordinary steel springs.

Figure 1:
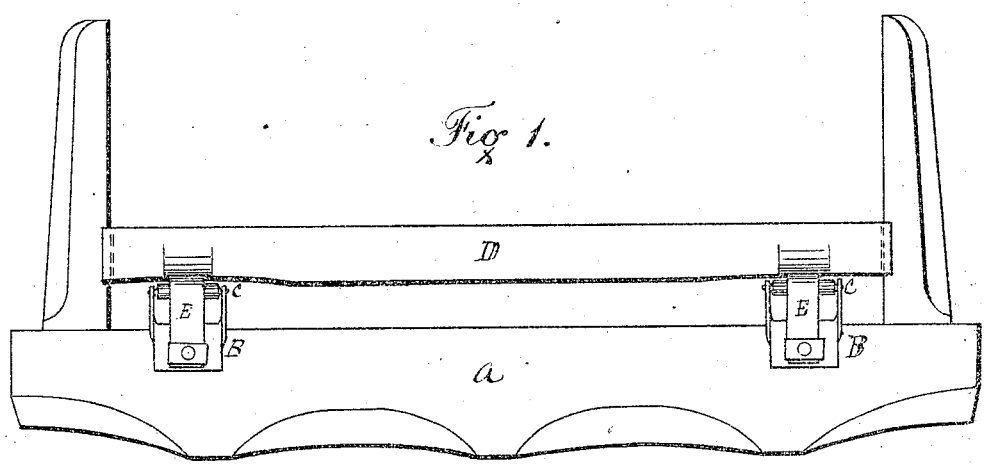
Figure 2:
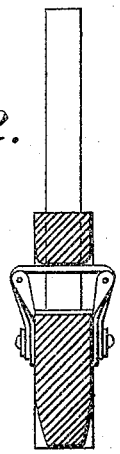

Figure 1 is a side elevation. Fig. 2 is an end section.

A represents the bolster, to which I apply my invention by means of the two stands B B, which are made of cast-iron or any other suitable material, and which straddle the bolster and are secured in their place by screw-bolts, which secure the gum also into its place. Said stands have upwardly-projecting jaws with open slots cast in them to receive the journals of the rollers C C, upon which the gum E E bears. D is a bar of the requisite size and strength to bear the load or weight which may be placed upon it, said bar being fitted between the standards, and has short projections, which serve as guides to keep it in its place when operated upon by the elasticity of the springs. The bar D may be made fast to the under side of the wagon-bed or left free from the same, as may be preferred by the user.

I am aware that gum has been used in various ways for springs, such as being confined in chambers of square or cylindrical form, in which case gritty substances may collect and injure the gum, or water may be confined to freeze and break the parts containing it, my invention being free from such liability and much cheaper in its application.

I claim as my invention—

The combination of the stands B B, rollers C C, gum E E, and bar D, substantially as and for the purpose hereinbefore set forth.

Signed this 14th day of February, 1873.

HENRY BUCK.

Witnesses:
EDM. F. BROWN,
SAMUEL L. DENNEY.